(12) United States Patent
Ma et al.

(10) Patent No.: US 12,287,205 B2
(45) Date of Patent: Apr. 29, 2025

(54) THREE-AXIS MEMS GYROSCOPE

(71) Applicant: AAC Kaitai Technologies (Wuhan) CO., LTD, Hubei (CN)

(72) Inventors: Zhao Ma, Shenzhen (CN); Zhan Zhan, Shenzhen (CN); Xiao Kan, Shenzhen (CN); Shan Yang, Shenzhen (CN); Shitao Yan, Shenzhen (CN); Hongtao Peng, Shenzhen (CN); Yang Li, Shenzhen (CN); Kahkeen Lai, Singapore (SG); Veronica Tan, Singapore (SG)

(73) Assignee: AAC Kaitai Technologies (Wuhan) CO., LTD, Wuhan (CN)

( * ) Notice: Subject to any disclaimer, the term of this patent is extended or adjusted under 35 U.S.C. 154(b) by 337 days.

(21) Appl. No.: 17/880,642

(22) Filed: Aug. 3, 2022

(65) Prior Publication Data

US 2023/0314139 A1 Oct. 5, 2023

(30) Foreign Application Priority Data

Mar. 9, 2022 (CN) .......................... 202210230313.0

(51) Int. Cl.
*G01C 19/5747* (2012.01)
*G01C 19/5656* (2012.01)

(52) U.S. Cl.
CPC ..... *G01C 19/5747* (2013.01); *G01C 19/5656* (2013.01)

(58) Field of Classification Search
CPC ................ G01C 19/56; G01C 19/5719; G01C 19/5733; G01C 19/574; G01C 19/5747; G01C 19/5783
See application file for complete search history.

(56) References Cited

U.S. PATENT DOCUMENTS

2020/0096337 A1* 3/2020 Senkal ............... G01C 19/5733

* cited by examiner

*Primary Examiner* — Benjamin R Schmitt
(74) *Attorney, Agent, or Firm* — Wiersch Law Group (57) ABSTRACT

A three-axis MEMS gyroscope includes a substrate, a sensing unit connected with the substrate, and a driving unit driving the sensing unit to move. The substrate includes anchor point structures and coupling structures connected with the anchor point structures. The driving unit includes driving pieces. One ends of each of the driving pieces are elastically connected with an adjacent coupling structure. The sensing unit includes X and Y mass blocks and Z mass blocks. Each of the X and Y mass blocks is arranged in a corresponding avoiding space. The X and Y mass blocks are respectively connected with adjacent coupling structures to form a rectangular frame. The Z mass blocks are connected with the driving pieces and separately arranged on one side of each driving piece away from each anchor point structure. The three-axis MEMS gyroscope is differentially driven, which realizes differential detection and reduces quadrature error.

8 Claims, 9 Drawing Sheets

THREE-AXIS MEMS GYROSCOPE

TECHNICAL FIELD

The present disclosure relates to a field of MEMS sensor technology, and in particular to a three-axis MEMS gyroscope

BACKGROUND

Micro-electro-mechanical system (MEMS) gyroscope, also known as silicon micro-electromechanical gyroscope, is a typical miniature angular velocity sensor. Due to advantages of small size, low power consumption, and convenient processing, the MEMS gyroscopes have a very wide range of applications in the consumer electronics market. In recent years, with gradual improvement of performance of the MEMS gyroscopes, the MEMS gyroscopes are widely used in automotive, industrial, virtual reality and other fields.

MEMS out-of-plane oscillating gyroscope is a typical representative of MEMS out-of-plane detecting gyroscopes. In a drive mode, a MEMS oscillating gyroscope oscillates around an axis perpendicular to mass blocks. When an angular velocity $\Omega$ is applied, the MEMS oscillating gyroscope transfers energy and is switched to a sense mode due to the Coriolis effect, which indirectly drives a vibrating disk to oscillate out-of-plane. A value of the angular velocity $\Omega$ is obtained by detecting a displacement of the out-of-plane oscillation.

US patent application publication U.S. Pat. No. 8,459,110B2 (CN 102183246B) discloses an integrated MEMS gyroscope that comprises first driving mass blocks and second driving mass blocks. The first driving mass blocks and the second driving mass blocks respond to the angular velocity sensed by the integrated MEMS gyroscope to generate a sensing motion. Then the sensing motion is detected to obtain the angular velocity. The integrated MEMS gyroscope is able to realize three-axis detection. However, sense modes of the integrated MEMS gyroscope are coupled with each other, resulting in superposition of errors.

Therefore, it is necessary to improve the prior art and provide a three-axis MEMS gyroscope.

SUMMARY

A purpose of the present disclosure is to provide a three-axis micro-electro-mechanical system (MEMS) gyroscope, which is configured to solve a problem that sense modes of a conventional MEMS gyroscope are coupled with each other, resulting in superposition of errors.

The present disclosure provides a three-axis MEMS gyroscope. The three-axis MEMS gyroscope comprises a substrate, a sensing unit elastically connected with the substrate, and a driving unit coupled with the sensing unit and driving the sensing unit to move. The substrate is of a rectangular shape. The substrate comprises four anchor point structures respectively located at four corners of the substrate and four coupling structures respectively elastically connected with the four anchor point structures. An avoiding space is formed between each two adjacent coupling structures.

The driving unit comprises four driving pieces located at an interior of the four corners of the substrate. One ends of each of the driving pieces are elastically connected with an adjacent coupling structures. The four driving pieces are frame-shaped. The four driving pieces are enclosed to form a ring shape and are symmetrically arranged.

The sensing unit comprises four X and Y mass blocks and four Z mass blocks. Each of the four X and Y mass blocks is arranged in a corresponding avoiding space. The four X and Y mass blocks are respectively elastically connected with adjacent coupling structures to form a rectangular frame. Each of the Z mass blocks is elastically connected with a corresponding driving piece and is arranged on one side of the corresponding driving piece away from a corresponding anchor point structure. Each two adjacent Z mass blocks are elastically connected with each other.

Optionally, each of the anchor point structures comprises a plurality of sub-anchor points with a same shape and arranged at intervals. Each of the coupling structures comprises a coupling ring sleeved on outer sides of corresponding sub-anchor points. An inner side of each coupling ring extends inward toward a space between the corresponding sub-anchor points to form coupling beams connected with the corresponding sub-anchor points. The coupling beams of each coupling ring comprises a first bending portion extending inward toward the space of the corresponding sub-anchor points.

Optionally, T-shaped grooves are formed by inwardly extending from two ends of each of the X and Y mass blocks close to corresponding coupling rings. An outer wall of each coupling ring extends outward to form T-shaped flexible beams. Each of the T-shaped flexible beams is received in a corresponding T-shaped groove and is connected with a corresponding X and Y mass block. The four X and Y mass blocks and the coupling structures are elastically connected to form the rectangular frame through the T-shaped flexible beams and the T-shaped grooves.

Optionally, a long groove extending along a width direction of each of the X and Y mass blocks is provided on a middle portion of each of the X and Y mass blocks. The substrate further comprises mass block anchor points. Each of the mass block anchor points is received in a corresponding long groove. An inner wall of each long groove extend toward a corresponding mass block anchor point to form flexible beams with second bending portions. The flexible beams of each long groove are connected to the corresponding mass block anchor point. The second bending portions are bent from a middle portion of each long groove toward two ends of each long groove.

Optionally, each of the driving pieces comprises two extending portions and a convex portion. The two extending portions of each of the driving pieces extend in a direction perpendicular to a corresponding diagonal line of the rectangular frame. The convex portion of each of the driving pieces connects the two extending portions of each of the driving pieces and protrudes toward a corresponding corner direction of the rectangular frame. Two ends of the convex portion of each of the driving pieces close to a corresponding corner side of the rectangular frame extend outward to form T-shaped connecting beams. The T-shaped connecting beams comprise third bending portions. A tail portion of each of the T-shaped connecting beams is connected to an outer wall of a corresponding coupling ring.

Optionally, the substrate further comprises first driving piece anchor point arranged at intervals on two sides of each convex portion. Each convex portion is connected with corresponding first driving piece anchor points through first guiding beams. A middle portion of each of the first guiding beams is bent along a corresponding convex portion. The substrate further comprises second driving piece anchor points arranged at intervals. Each of the second driving piece anchor points is arranged on one side of each of the extending portions. Each of the second driving piece anchor points is connected with a corresponding extending portion through a second guiding beam. A middle portion of each of the second guiding beams is bent along the corresponding extending portion.

Optionally, each of the Z mass blocks is arranged between the two extending portions of a corresponding driving piece. One side of each of the Z mass blocks close to the corresponding driving pieces extends to form a first flexible beam connected to an inner side of the corresponding extending portion. A middle portion of each first flexible beam is bent and extends toward a middle portion of a notch formed between the two extending portions of the corresponding driving piece.

Optionally, the four Z-mass blocks are annularly arranged on diagonal lines of the rectangular frame. Each two adjacent Z mass blocks are spaced apart to form a gap. Each two adjacent Z mass blocks are connected with each other through a second flexible beam. A middle portion of each second flexible beam is bent along a length direction of a corresponding gap.

Optionally, the three-axis MEMS gyroscope further comprises driving transducers arranged corresponding to the driving pieces, first detecting transducers arranged corresponding to the X and Y mass blocks, and second detecting transducers arranged corresponding to the Z mass blocks.

In the present disclosure, the mass blocks and the detecting electrodes adopt a symmetrical layout, which is convenient for differential detection.

A drive mode of the three-axis MEMS gyroscope is differential drive, which can effectively improve stability of driving of the three-axis MEMS gyroscope.

Sense modes of the X, Y, and Z axes of the three-axis MEMS gyroscope realize anti-phase vibration, which effectively avoid influence of acceleration shock and quadrature error.

The mass blocks are elastically connected to the anchor points through the decoupling structures, which effectively reduces coupling between motions of different modes of the mass blocks, avoids the interference of the motions of different modes, reduces a displacement of non-moving mass blocks, reduces the orthogonal error, and is beneficial to bias stability of the sensing unit.

The mass blocks are elastically connected through the decoupling structures to realize the anti-phase movement of different mass blocks, effectively forming differential detection.

The angular velocity of the three axes of the three-axis MEMS gyroscope is independently detected, which effectively avoids coupling of detection errors of different axes and improves the detection accuracy of the three-axis MEMS gyroscope.

DETAILED DESCRIPTION

The present disclosure will be further described below with reference to the accompanying drawings and embodiments.

Figure 1:
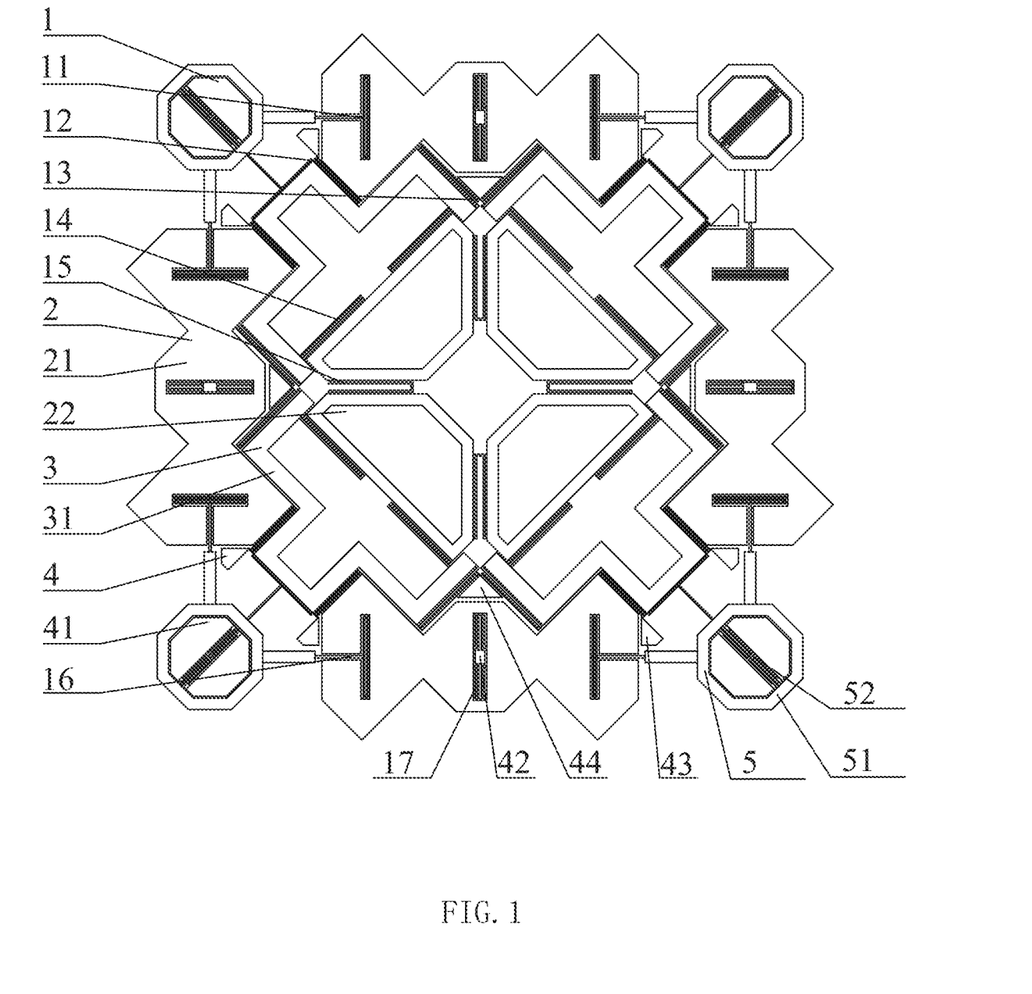
FIG. 1 is a plan schematic diagram of an three-axis MEMS gyroscope of the present disclosure.

FIG. 1 is a plan schematic diagram of an three-axis MEMS gyroscope of the present disclosure. As shown in FIG. 1, the present disclosure provides a three-axis MEMS gyroscope. The three-axis MEMS gyroscope comprises a substrate 1 (in FIG. 1, the substrate is a plate structure and is arranged below other components, so it is shown blank in the figure), a sensing unit 2 elastically connected with the substrate 1, and a driving unit 3 coupled with the sensing unit 2 and driving the sensing unit 2 to move. The substrate 1 is of a rectangular shape. The substrate 1 comprises four anchor point structures 4 respectively located at four corners of the substrate and four respectively elastically connected with the four anchor point structures 4. An avoiding space is formed between each two adjacent coupling structures 5.

The driving unit 3 comprises four driving pieces 31 located at an interior of the four corners of the substrate 1. One ends of each of the driving pieces 31 are elastically connected with an adjacent coupling structure 5. The four driving pieces 31 are frame-shaped. The four driving pieces 31 are enclosed to form a ring shape and are symmetrically arranged.

The sensing unit 2 comprises four X and Y mass blocks 21 and four Z mass blocks 22. Each of the four X and Y mass blocks 21 is arranged in a corresponding avoiding space. The four X and Y mass blocks 21 are respectively elastically connected with adjacent coupling structures 5 to form a rectangular frame. Each of the Z mass blocks 22 is elastically connected with a corresponding driving piece 31 and is arranged on one side of the corresponding driving piece 31 away from a corresponding anchor point structure 4. Each two adjacent Z mass blocks 22 are elastically connected with each other.

Each of the anchor point structures 4 comprises two sub-anchor points 41 with a same shape and arranged at intervals. Each of the coupling structures 5 comprises a coupling ring 51 sleeved on outer sides of two corresponding sub-anchor points 41. An inner side of each coupling ring 51 extends inward toward a space between the two corresponding sub-anchor points 41 to form coupling beams 52 connected with the corresponding sub-anchor points 41. The coupling beams 52 of each coupling ring 51 comprises a first bending portion extending inward toward the space between two corresponding sub-anchor points 41.

In one embodiment, a shape of an inner side of each of the X and Y mass blocks 21 matches a shape of an outer wall of each of the driving pieces 31. The X and Y mass blocks are symmetrically arranged with respect to a corresponding side of the rectangular frame. The driving pieces 31 are symmetrically arranged with respect to a corresponding side of the rectangular frame. T-shaped grooves are formed by inwardly extending from two ends of each of the X and Y mass blocks 21 close to corresponding coupling rings 51. An outer wall of each coupling ring 51 extends outward to form T-shaped flexible beams 16. Each of the T-shaped flexible beams 16 is received in a corresponding T-shaped groove and is connected with a corresponding X and Y mass block 21. The four X and Y mass blocks 21 and the coupling structures 5 are elastically connected to form the rectangular frame through the T-shaped flexible beams 16 and the T-shaped grooves.

In one embodiment, a long groove extending along a width direction of each of the X and Y mass blocks 21 is provided on a middle portion of each of the X and Y mass blocks 21. The substrate 1 further comprises mass block anchor points 42. Each of the mass block anchor points 42 is received in a corresponding long groove. An inner wall of each long groove extend toward a corresponding mass block anchor point 42 to form flexible beams 17 with second bending portions. The flexible beams 17 of each long groove are connected to the corresponding mass block anchor point 42. The second bending portions are bent from a middle portion of each long groove toward two ends of each long groove.

In one embodiment, each of the driving pieces 31 comprises two extending portions and a convex portion. The two extending portions of each of the driving pieces 31 extend in a direction perpendicular to a corresponding diagonal line of the rectangular frame. The convex portion of each of the driving pieces 31 connects the two extending portions of each of the driving pieces 31 and protrudes toward a corresponding anchor point structure 4. Two ends of the convex portion of each of the driving pieces 31 close to corresponding anchor point structures 4 extend outward to form T-shaped connecting beams. The T-shaped connecting beams 11 comprise third bending portions. A tail portion of each of the T-shaped connecting beams 11 is connected to an outer wall of a corresponding coupling ring 51.

In one embodiment, the substrate 1 further comprises first driving piece anchor point 43 arranged at intervals on two sides of each convex portion. Each convex portion is connected with corresponding first driving piece anchor points 43 through first guiding beams 12. A middle portion of each of the first guiding beams 12 is bent along a gap between a corresponding convex portion the corresponding X and Y mass block 21.

In one embodiment, the substrate 1 further comprises second driving piece anchor points 44 arranged at intervals. Each of the second driving piece anchor points 44 is arranged on one side of each of the extending portions. Each of the second driving piece anchor points 44 is connected with a corresponding extending portion through a second guiding beam 13. A middle portion of each of the second guiding beams 13 is bent along a gap between the corresponding extending portion and the corresponding X and Y mass block 21.

In one embodiment, a notch is formed between the two extending portions of each of the driving pieces 31. Each of the Z mass blocks 22 is arranged in the notch of a corresponding driving piece 31. One side of each of the Z mass blocks 22 close to the corresponding driving pieces 31 extends to form a first flexible beam 14 connected to an inner side of the corresponding extending portion. A middle portion of each first flexible beam 14 is bent and extends toward a middle portion of the notch of the corresponding driving piece 31.

In one embodiment, the four Z-mass blocks 22 are annularly arranged on diagonal lines of the rectangular frame. A width of one end of each of the Z mass blocks 22 away from the driving pieces 31 is less than a width of another end of each of the Z mass blocks 22 close to the driving pieces 31, Each two adjacent Z mass blocks 22 are spaced apart to form a gap. Each two adjacent Z mass blocks 22 are connected with each other through a second flexible beam 15. A middle portion of each second flexible beam 15 is bent along a length direction of a corresponding gap.

In one embodiment, the three-axis MEMS gyroscope further comprises driving transducers arranged corresponding to the driving pieces 31, first detecting transducers arranged corresponding to the X and Y mass blocks 21, and second detecting transducers arranged corresponding to the Z mass blocks 22.

Figure 2:
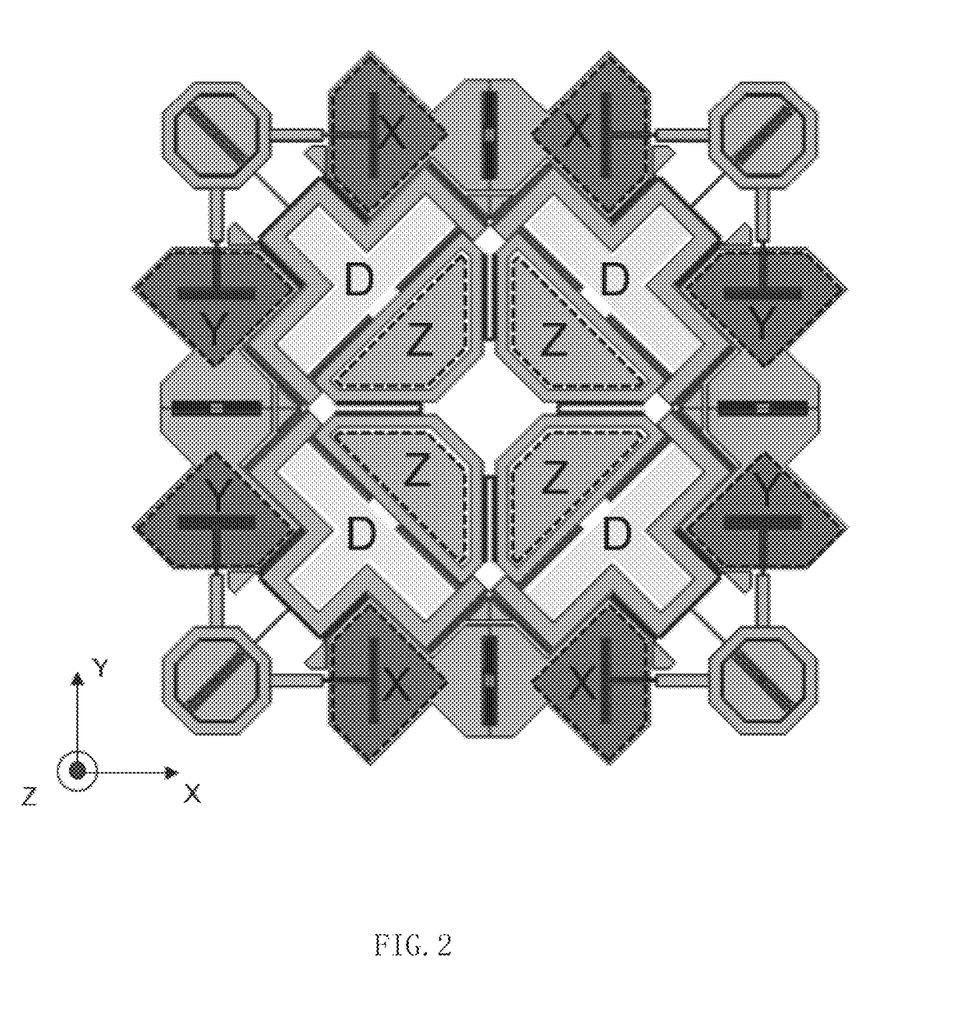
FIG. 2 is a top schematic diagram showing arrangement positions of detection circulator (also known as the detection electrode) and in-plane driving transducer (also known as in-plane driving electrodes) in the three-axis MEMS gyroscope of the present disclosure.
Figure 3:
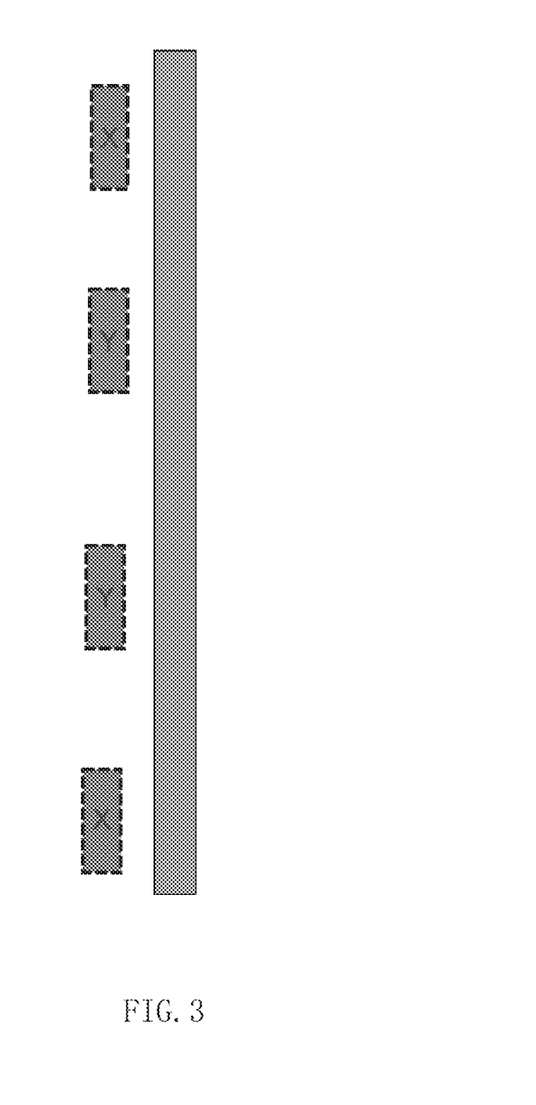
FIG. 3 is a side schematic diagram of FIG. 2.

FIG. 2 is a top schematic diagram showing arrangement positions of detection circulator (also known as the detection electrode) and in-plane driving transducer (also known as in-plane driving electrodes) in the MEMS gyroscope for three-axis detection of the present disclosure. FIG. 3 is a side view of FIG. 2. As shown in FIGS. 2 and 3, the short sides of each of the Z mass blocks 22 and the short sides of the corresponding driving pieces 31 are spaced apart to form a rectangular avoiding space. When in use, an in-plane driving transducer is arranged in each rectangular avoiding space. The driving transducers drive the driving pieces to vibrate. X surface detecting transducers and Y surface detecting transducers are respectively arranged symmetrically above the X and Y mass blocks 21. A Z surface detecting transducer is arranged in the rectangular frame of each of the Z mass block 22.

In the present disclosure, the driving pieces and the anchor areas are connected through flexible beams. The flexible beams provide a single-direction degree of freedom in the plane where the X and Y mass blocks are located. The X and Y mass blocks are connected with the coupling rings through the T-shaped flexible beams. The T-shaped flexible beams provide degrees of freedom of rotating in the plane where the X and Y mass blocks are located and swinging out of the plane where the X and Y mass blocks are located. The Z mass blocks are connected with the driving pieces through the first flexible beams. The first flexible beams provide a single degree of freedom of the Z mass blocks perpendicular to the moving direction of the driving pieces. The decoupling mass blocks are connected with the Z mass blocks through the third flexible beams. The third flexible beams provide a single degree of freedom of the decoupling mass blocks parallel to the moving direction of the driving pieces.

The three-axis MEMS gyroscope of the present disclosure has four working modes. One is the drive mode; the other three modes are the X-axis sense mode, Y-axis sense mode, and Z-axis sense mode]. The angular velocity sensing principle of the three-axis MEMS gyroscope of the present disclosure will be explained as follows in combination of the working modes thereof.

Figure 4:
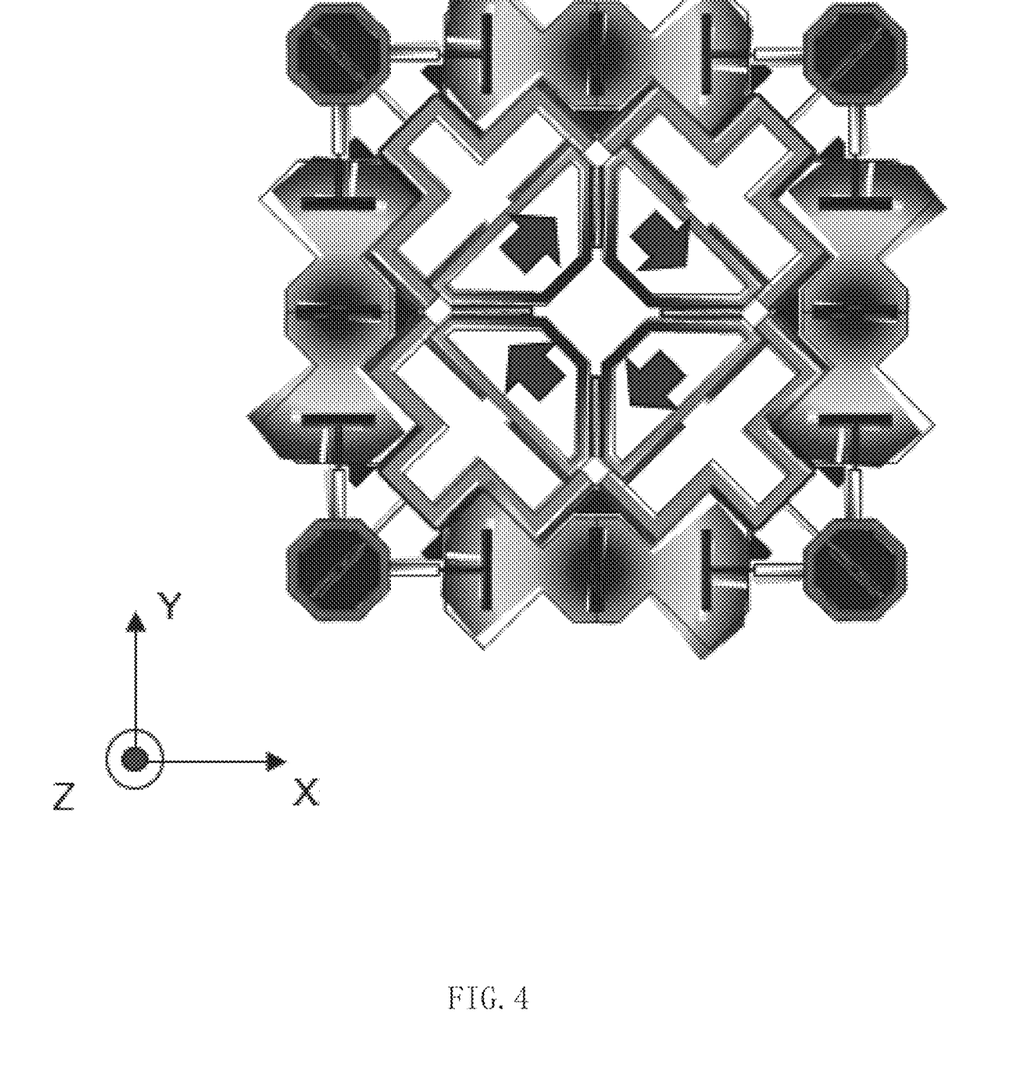
FIG. 4 is a schematic diagram showing a Z-axis angle detection principle of the three-axis MEMS gyroscope shown in a drive mode.
Figure 5:
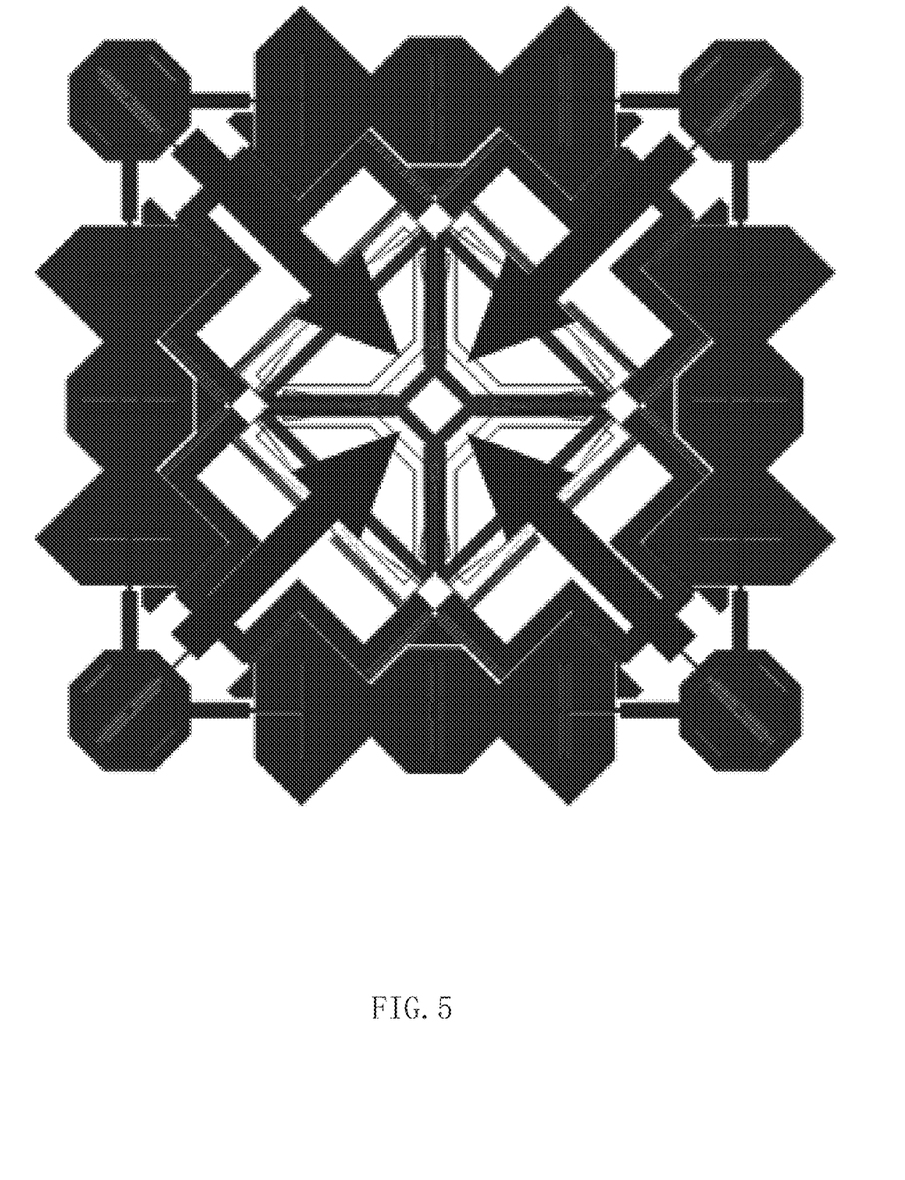
FIG. 5 is a schematic diagram showing the Z-axis angle detection principle of the three-axis MEMS gyroscope shown in a Z-axis sense mode.

FIG. 4 is a schematic diagram showing a Z-axis angle detection principle of the three-axis MEMS gyroscope shown in a drive mode. FIG. 5 is a schematic diagram showing the Z-axis angle detection principle of the three-axis MEMS gyroscope shown in a Z-axis sense mode. As shown in FIGS. 4 and 5, in a process of Z-axis angle detection, the MEMS gyroscope has two vibration modes. In the drive mode, the Z mass blocks move in a horizontal direction in the plane where the Z mass blocks are located. In the Z-axis sense mode, the Z mass blocks move in a vertical direction in the where the Z mass blocks are located. With an external driving force, the MEMS gyroscope is driven to vibrate in the two modes. At this time, when the MEMS gyroscope of the present disclosure senses a Z-axis angular velocity ω, according to the Coriolis principle, the Z-axis angular velocity ω generates the Coriolis force along a Y-axis direction, and the Coriolis force forces the MEMS gyroscope of the present disclosure to vibrate in the Z-axis sense mode. Finally, a value of the Z-axis angular velocity ω is obtained by detecting a vibration displacement of the MEMS gyroscope of the present disclosure along the Y-axis direction.

Figure 6:
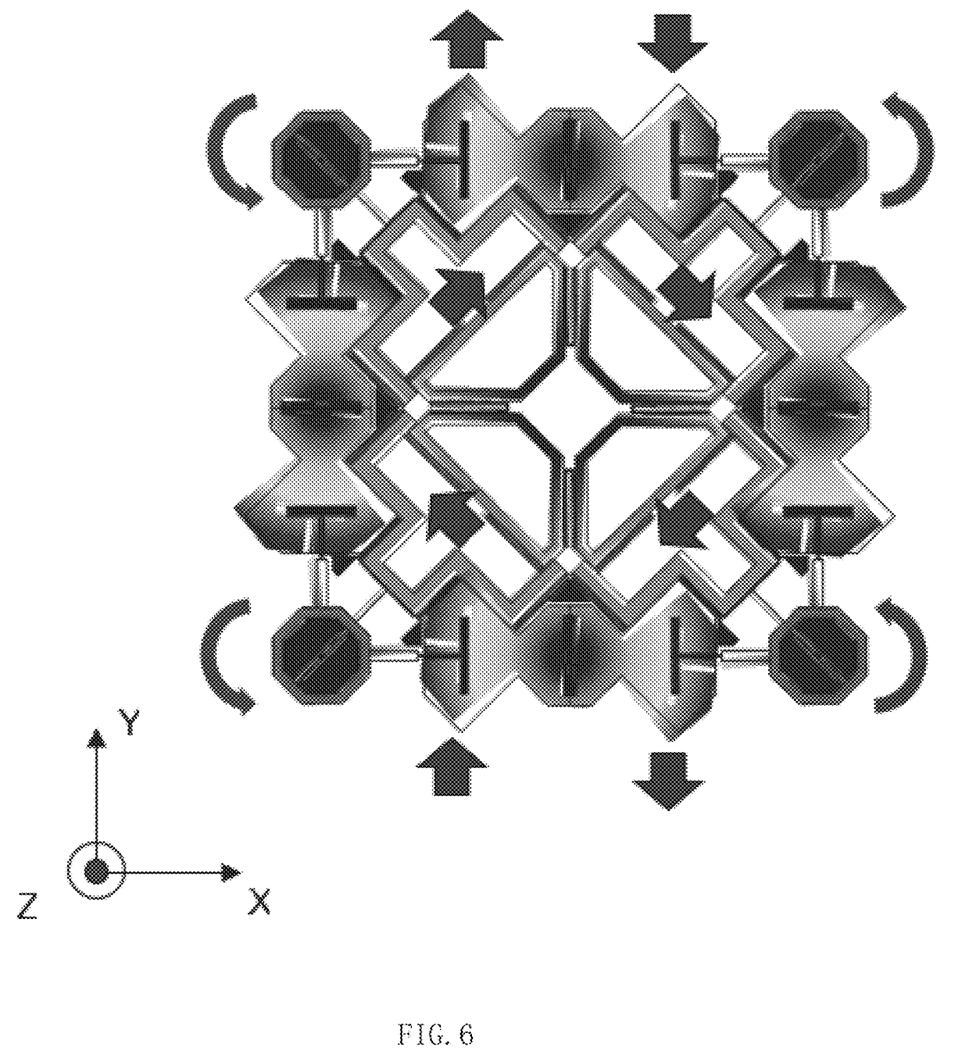
FIG. 6 is a schematic diagram showing an X-axis angle detection principle of the three-axis MEMS gyroscope shown in a drive mode.
Figure 7:
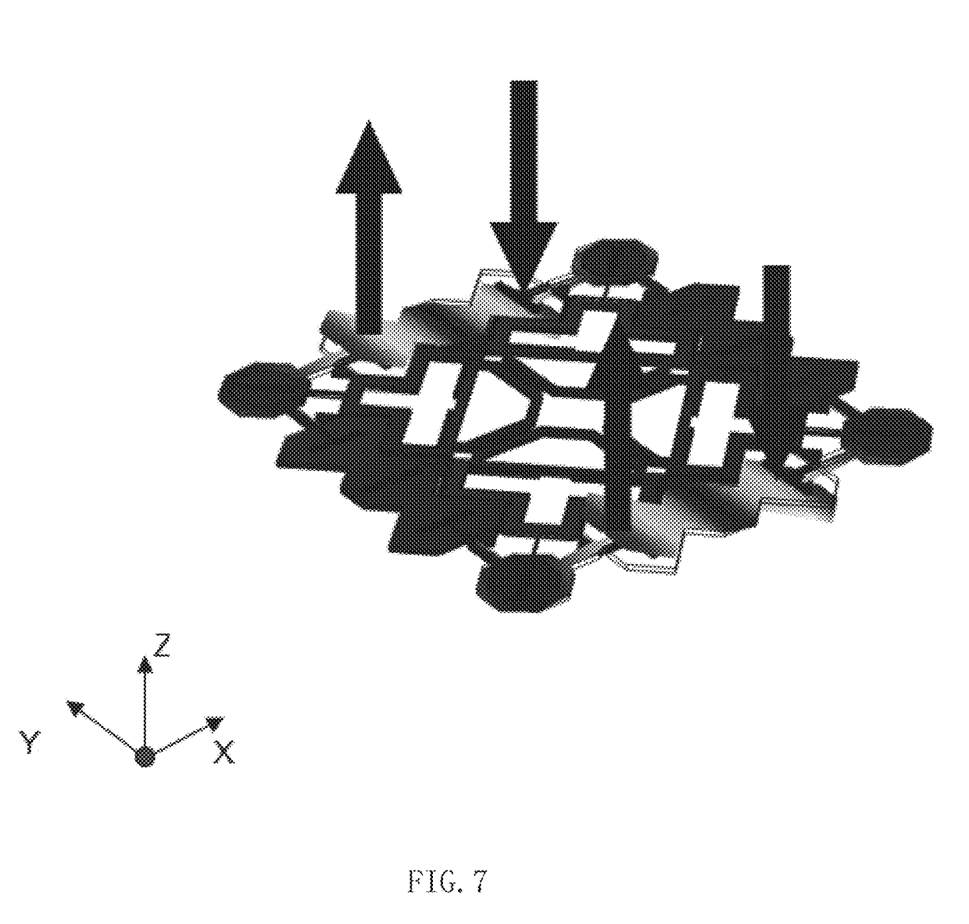
FIG. 7 is a schematic diagram showing the X-axis angle detection principle of the three-axis MEMS gyroscope shown in a Z-axis sense mode.

FIG. 6 is a schematic diagram showing an X-axis angle detection principle of the three-axis MEMS gyroscope shown in a drive mode. FIG. 7 is a schematic diagram showing the X-axis angle detection principle of the three-axis MEMS gyroscope shown in a Z-axis sense mode. As shown in FIGS. 6 and 7, in a process of X-axis angle detection, the MEMS gyroscope has two vibration modes. In the drive mode, the X and Y mass blocks move in the vertical direction. In the X-axis sense mode, the X and Y mass blocks vibrate out of plane where the X and Y blocks are located. With an external driving force, the MEMS gyroscope is driven to vibrate in the two modes. At this time, when the MEMS gyroscope of the present disclosure senses an X-axis angular velocity ω, according to the Coriolis principle, the X-axis angular velocity ω generates the Coriolis force along a Z-axis direction, and the Coriolis force forces the MEMS gyroscope of the present disclosure to vibrate in the X-axis sense mode. Finally, a value of the X-axis angular velocity ω is obtained by detecting a vibration displacement of the MEMS gyroscope of the present disclosure along the Z-axis direction.

Figure 8:
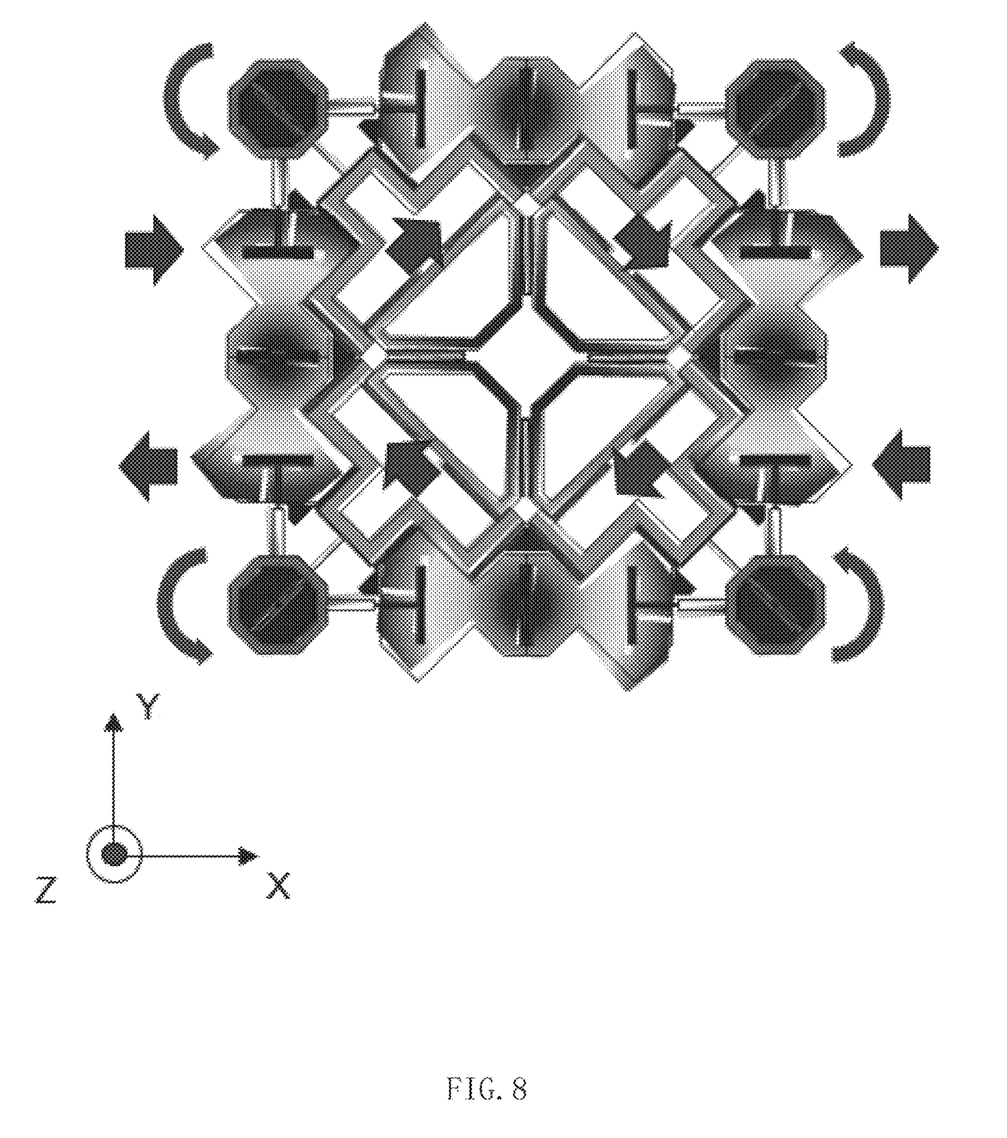
FIG. 8 is a schematic diagram showing a Y-axis angle detection principle of the three-axis MEMS gyroscope shown in a drive mode.
Figure 9:
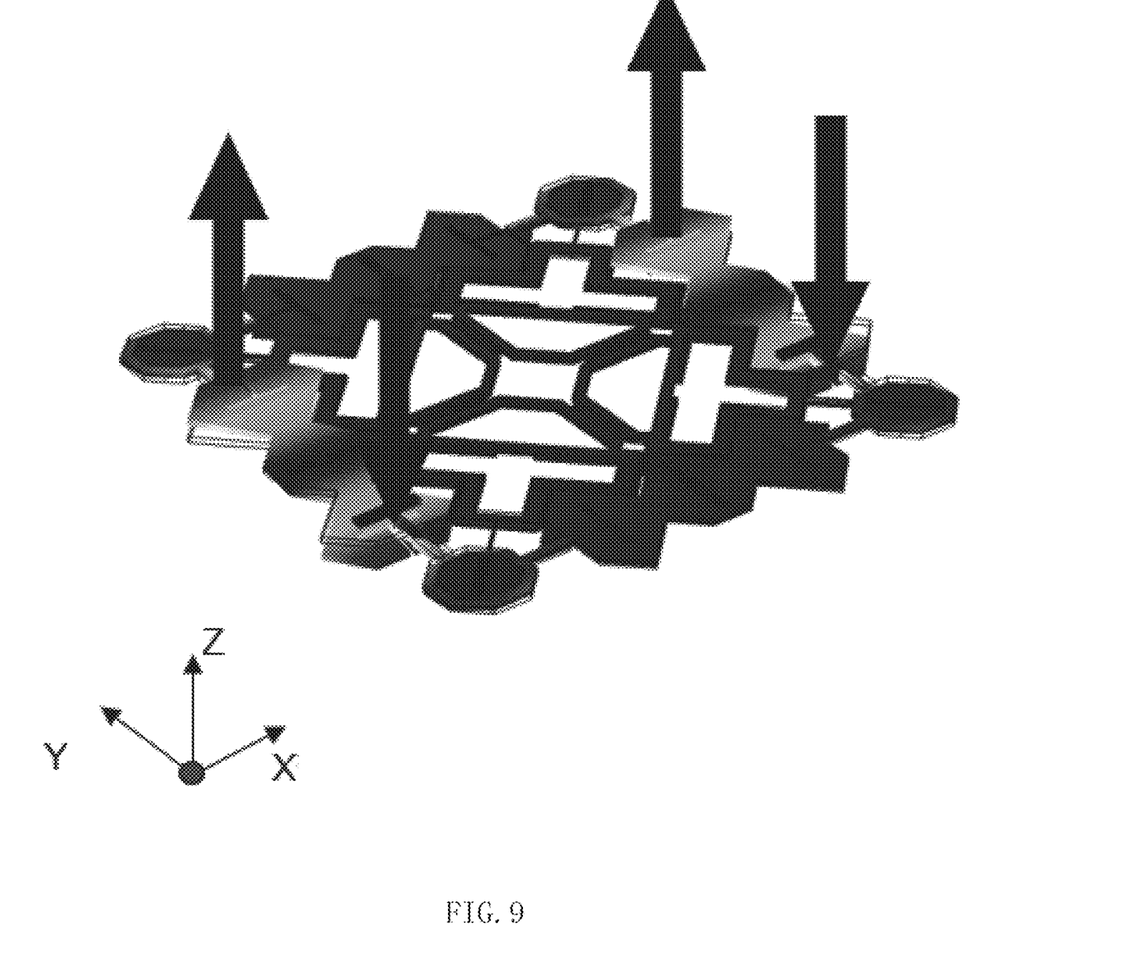
FIG. 9 is a schematic diagram showing the Y-axis angle detection principle of the three-axis MEMS gyroscope shown in a Y-axis sense mode.

FIG. 8 is a schematic diagram showing a Y-axis angle detection principle of the three-axis MEMS gyroscope shown in a drive mode. FIG. 9 is a schematic diagram showing the Y-axis angle detection principle of the three-axis MEMS gyroscope shown in a Y-axis sense mode. As shown in FIGS. 8 and 9, in a process of Y-axis angle detection, the MEMS gyroscope has two vibration modes. In the drive mode, the X and Y mass blocks move in the horizontal direction. In the Y-axis sense mode, the X and Y mass blocks vibrate out of plane where the X and Y blocks are located. With an external driving force, the MEMS gyroscope is driven to vibrate in the two modes. At this time, when the MEMS gyroscope of the present disclosure senses a Y-axis angular velocity ω, according to the Coriolis principle, the Y-axis angular velocity ω generates the Coriolis force along a Z-axis direction, and the Coriolis force forces the MEMS gyroscope of the present disclosure to vibrate in the Y-axis sense mode. Finally, a value of the Y-axis angular velocity ω is obtained by detecting a vibration displacement of the MEMS gyroscope of the present disclosure along the Z-axis direction.

In practical engineering practice, the MEMS gyroscope has several capacitors. The capacitors are configured to generate the external driving force required to force the MEMS gyroscope of the present disclosure to vibrate in the drive mode. The capacitors are configured to detect the vibration displacement of the MEMS gyroscope of the present disclosure along the vibration direction of the sense modes. The capacitors are further configured to suppress the quadrature error of the MEMS gyroscope of the present disclosure.

The above are only embodiments of the present disclosure. It should be pointed out that for those of ordinary skill in the art, improvements can be made without departing from the inventive concept of the present disclosure, which should all fall within the protection scope of the present disclosure.

What is claimed is:

1. A three-axis micro-electro-mechanical system (MEMS) gyroscope, comprising:
a substrate;
a sensing unit elastically connected with the substrate; and
a driving unit coupled with the sensing unit and driving the sensing unit to move;
wherein the substrate is of a rectangular shape; the substrate comprises four anchor point structures respectively located at four corners of the substrate and four coupling structures respectively elastically connected with the four anchor point structures; and an avoiding space is formed between each two adjacent coupling structures;
wherein the driving unit comprises four driving pieces located at an interior of the four corners of the substrate; one ends of each of the driving pieces are elastically connected with an adjacent coupling structure; the four driving pieces are frame-shaped; the four driving pieces are enclosed to form a ring shape and are symmetrically arranged;
wherein the sensing unit comprises four X and Y mass blocks and four Z mass blocks; each of the four X and Y mass blocks is arranged in a corresponding avoiding space; the four X and Y mass blocks are respectively elastically connected with adjacent coupling structures to form a rectangular frame; each of the Z mass blocks is elastically connected with a corresponding driving piece and is arranged on one side of the corresponding driving piece away from a corresponding anchor point structure; each two adjacent Z mass blocks are elastically connected with each other, each of the anchor point structures comprises a plurality of sub-anchor points with a same shape and arranged at intervals; each of the coupling structures comprises a coupling ring sleeved on outer sides of corresponding sub-anchor points; an inner side of each coupling ring extends inward toward a space between the corresponding sub-anchor points to form coupling beams connected with the corresponding sub-anchor points; the coupling beams of each coupling ring comprises a first bending portion extending inward toward the space of the corresponding sub-anchor points.

2. The three-axis MEMS gyroscope according to claim 1, wherein T-shaped grooves are formed by inwardly extending from two ends of each of the X and Y mass blocks close to corresponding coupling rings; an outer wall of each coupling ring extends outward to form T-shaped flexible beams; each of the T-shaped flexible beams is received in a corresponding T-shaped groove and is connected with a corresponding X and Y mass block; the four X and Y mass blocks and the coupling structures are elastically connected to form the rectangular frame through the T-shaped flexible beams and the T-shaped grooves.

3. The three-axis MEMS gyroscope according to claim 2, wherein a long groove extending along a width direction of each of the X and Y mass blocks is provided on a middle portion of each of the X and Y mass blocks; the substrate further comprises mass block anchor points; each of the mass block anchor points is received in a corresponding long groove; an inner wall of each long groove extend toward a corresponding mass block anchor point to form flexible beams with second bending portions; the flexible beams of each long groove are connected to the corresponding mass block anchor point; the second bending portions are bent from a middle portion of each long groove toward two ends of each long groove.

4. The three-axis MEMS gyroscope according to claim 1, wherein each of the driving pieces comprises two extending portions and a convex portion; the two extending portions of each of the driving pieces extend in a direction perpendicular to a corresponding diagonal line of the rectangular frame, the convex portion of each of the driving pieces connects the two extending portions of each of the driving pieces and protrudes toward a corresponding corner direction of the rectangular frame; two ends of the convex portion of each of the driving pieces close to a corresponding corner side of the rectangular frame extend outward to form T-shaped connecting beams; the T-shaped connecting beams comprise third bending portions; a tail portion of each of the T-shaped connecting beams is connected to an outer wall of a corresponding coupling ring.

5. The three-axis MEMS gyroscope according to claim 4, wherein the substrate further comprises first driving piece anchor point arranged at intervals on two sides of each convex portion; each convex portion is connected with corresponding first driving piece anchor points through first guiding beams; a middle portion of each of the first guiding beams is bent along a corresponding convex portion; the substrate further comprises second driving piece anchor points arranged at intervals; each of the second driving piece anchor points is arranged on one side of each of the extending portions; each of the second driving piece anchor points is connected with a corresponding extending portion through a second guiding beam; a middle portion of each of the second guiding beams is bent along the corresponding extending portion.

6. The three-axis MEMS gyroscope according to claim 4, wherein each of the Z mass blocks is arranged between the two extending portions of a corresponding driving piece; one side of each of the Z mass blocks close to the corresponding driving pieces extends to form a first flexible beam connected to an inner side of the corresponding extending portion; a middle portion of each first flexible beam is bent and extends toward a middle portion of a notch formed between the two extending portions of the corresponding driving piece.

7. The three-axis MEMS gyroscope according to claim 6, wherein the four Z-mass blocks are annularly arranged on diagonal lines of the rectangular frame; each two adjacent Z mass blocks are spaced apart to form a gap; each two adjacent Z mass blocks are connected with each other through a second flexible beam; a middle portion of each second flexible beam is bent along a length direction of a corresponding gap.

8. The three-axis MEMS gyroscope according to claim 1, wherein the three-axis MEMS gyroscope further comprises driving transducers arranged corresponding to the driving pieces, first detecting transducers arranged corresponding to the X and Y mass blocks, and second detecting transducers arranged corresponding to the Z mass blocks.

* * * * *